United States Patent [19]
Kleiner et al.

[11] Patent Number: 5,935,179
[45] Date of Patent: Aug. 10, 1999

[54] SYSTEM AND DEVICE FOR A SELF ORIENTING DEVICE

[75] Inventors: Mendel Kleiner, Hovås; Björn Riise, Sollentuna, both of Sweden

[73] Assignee: Aktiebolaget Electrolux, Stockholm, Sweden

[21] Appl. No.: 08/998,705

[22] Filed: Dec. 29, 1997

Related U.S. Application Data

[63] Continuation of application No. PCT/SE97/00625, Apr. 14, 1997.

[30] Foreign Application Priority Data

Apr. 30, 1996 [SE] Sweden .................................. 9601664

[51] Int. Cl.$^6$ ............................. G01S 15/93; G05D 1/03
[52] U.S. Cl. ................................ 701/23; 701/24; 701/41; 340/943
[58] Field of Search .................................. 701/23, 24, 26, 701/41, 300, 301; 340/943; 342/154, 126, 127, 140

[56] References Cited

U.S. PATENT DOCUMENTS

| | | | |
|---|---|---|---|
| 4,638,445 | 1/1987 | Mattaboni ................................ | 701/23 |
| 4,751,658 | 6/1988 | Kadonoff et al. ....................... | 701/301 |
| 5,001,635 | 3/1991 | Yasutomi et al. ........................ | 701/26 |
| 5,170,352 | 12/1992 | McTamaney et al. .................... | 701/26 |
| 5,204,814 | 4/1993 | Noonan et al. ........................... | 701/25 |
| 5,276,618 | 1/1994 | Everett, Jr. ................................ | 701/25 |
| 5,353,224 | 10/1994 | Lee et al. ................................... | 701/25 |
| 5,369,347 | 11/1994 | Yoo ................................... | 318/568.12 |
| 5,377,106 | 12/1994 | Drunk et al. ............................. | 180/169 |
| 5,446,445 | 8/1995 | Bloomfield et al. ..................... | 340/521 |
| 5,548,313 | 8/1996 | Bancroft ................................... | 701/23 |
| 5,682,313 | 10/1997 | Edlund et al. ........................... | 342/127 |

FOREIGN PATENT DOCUMENTS 9526512  5/1995  WIPO.

OTHER PUBLICATIONS

"Applications of Micromachined Capacitance Transducers In Air–Coupled Ultrasonics and Nondestructive Evaluation" D. W. Schindel et al., IEEE Transactions on Ultrasonics, Ferroelectrics, and Frequency Control, vol. 42, No. 1, Jan. 1995, pp. 51–58.

"Electroacoustic Model for Electrostatic Ultrasonic Transducers With V–Grooved Backplates", Pentti Mattila, et al. IEEE Transactions on Ultrasonics, Ferroelectrics, and Frequency Control, vol. 42, No. 1, Jan. 1995, pp. 1–7.

"The Design and Characterization of Micromachined Air–oupled Capacitance Transducers", David W. Schindel, et al, IEEE Transactions on Ultrasonics, Ferroelectrics, and Frequency Control vol. 42, No. 1, Jan. 1995, pp. 42–50.

*Primary Examiner*—Tan Nguyen
*Attorney, Agent, or Firm*—Young & Thompson

[57] ABSTRACT

The present invention discloses a proximity sensing system and an autonomous device, like a vacuum-cleaner, being provided with a pair of independent driven wheels (17, 18). The device contains for the proximity orientation and guiding a microprocessor system and a sonar system which includes at least an ultrasonic transmitter and an ultrasonic receiver. An additional mechanical touch sensor is also used in the form of a forward directed bumper (16) carrying the transmitter as well as receiving microphone units. The mechanical bumper actuates at least one touch sensor if the device makes contact with an obstacle in the course of the moving device. The transmitter is a stripe-shaped ultrasound transducer (10) which is positioned at the front of the device and transmits ultrasonic waves with a narrow vertical distribution within a wide sector in front of the device. The receiver includes a number of microphone units (12) provided with hollow pipes (12a, 12b) for the sound. The microphone units (12) together with the transmitter form an efficient sonar system for detecting echoes reflected from objects in the forward course of the moving device.

20 Claims, 8 Drawing Sheets

5,935,179

SYSTEM AND DEVICE FOR A SELF ORIENTING DEVICE

This is a continuation of copending international application PCT/SE97/00625 filed Apr. 14, 1997, which designates the United States.

TECHNICAL FIELD

The present invention refers to a self orientating device, particular a vacuum-cleaning device, and more exactly to a system and a device for the orientation in the immediate surroundings by means of an ultrasonic sonar system offering an advantageous sensing of obstacles in the course of the moving autonomous device.

BACKGROUND OF THE INVENTION

For many years there has been a desire to provide, for instance, an autonomous apparatus for floor treatment, particularly a vacuum-cleaner, which is controlled by a sensing system sweeping around the horizon in analogy, for example, with a ship radar. Then the desire is, that the apparatus should be able to orientate itself in a room, such that it, for instance, will be able to perform a cleaning function according to a predetermined pattern or a predetermined strategy and at the same time avoid colliding with different obstacles, which may be arranged in the room, besides avoiding collisions with the walls of the room.

Such a system is disclosed in the International Patent Application WO 95/26512 by the same applicant and which is expressly incorporated here by reference.

Still the system according to WO 95/26512 is rather complicated and it additionally utilizes a number of transponder devices for the initial orientation. These transponders are localized at a number of points in the room to be cleaned and the transponders are used as reference points. Another characteristic of the system according to WO 95/26512 is the utilization of an ultrasound transmitter placed on top of the device. This transmitter is used both for localization of the transponders scattered around the room and is simultaneously used as a proximity sensing system for detecting possible obstacles near to the moving apparatus. One disadvantage of the disclosed apparatus is due to limited bandwidth and therefore there will sometimes be present "dead" sectors.

Therefore there is a desire to find an improved apparatus for automatic polishing or vacuum-cleaning presenting an even better ability to find a clear way when performing its operation. The improved apparatus should also be simple and cheap to produce and thereby be able to present an appealing price to customers.

SUMMARY OF THE INVENTION

According to the present invention a proximity sensing system and device are provided for a self orientating device, particularly a vacuum-cleaner, which comprises a transmitter system cheap in production, which presents a large bandwidth, a high directivity resulting in high sensitivity at the receiver and at the same time constituting a very robust apparatus.

The present invention discloses a proximity sensing system and a device for an autonomous device being provided with a pair of motor driven wheels, the device comprising members for the proximity orientation and guiding of the device in the form of a microprocessor system and a proximity ultrasonic sensing system comprising at least one transmitting member and one receiving member and a mechanical sensing member in form of a forward directed bumper, wherein the mechanical sensing member is actuating at least one touch sensor if the device makes contact to an obstacle in the course of the moving device, the transmitting member is a stripe-shaped ultrasound transducer positioned at the front of the device and transmitting ultrasonic waves with a narrow vertical distribution within a wide sector in front of the device, and the receiving member comprises a number of microphone units provided with hollow pipes for the sound and forming a input portion of a receiving system for receiving echoes of the transmitted ultrasonic waves reflected from objects in the forward course of the moving device.

Further objects and advantages of the present invention are set forth by the dependent claims.

DESCRIPTION OF THE DRAWINGS

The invention will be described in form of a preferred embodiment by making reference to the accompanying drawings, in which.

AN ILLUSTRATIVE PREFERRED EMBODIMENT

General Features

Figure 1:
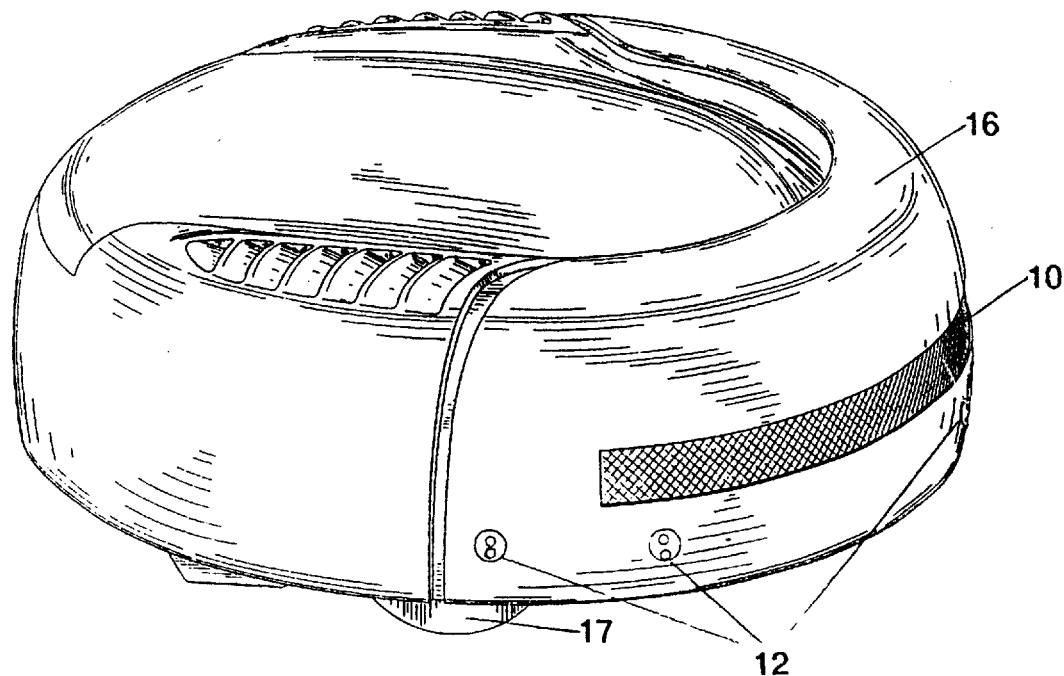
FIG. 1 demonstrates a top view of an autonomous device in an embodiment of a vacuum-cleaning robot incorporating the present invention.
Figure 2:
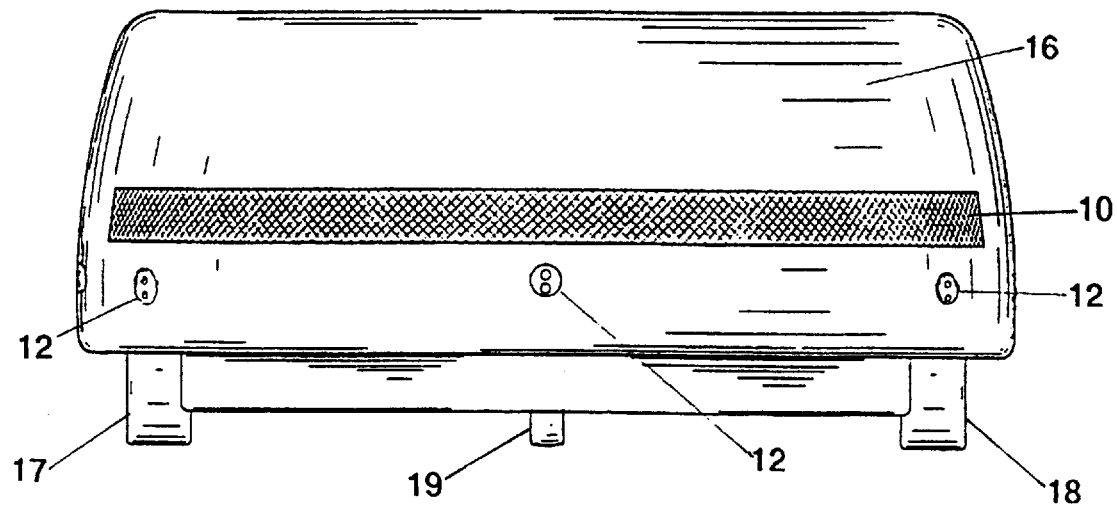
FIG. 2 demonstrates a side view of the device of FIG. 1.

FIG. 1 illustrates in a top view an illustrative embodiment of an autonomous vacuum-cleaning device, which by itself will move on a floor and vacuum-clean a room. In the front portion there is arranged an ultrasonic transmitter. The transmitter consists of a stripe-shaped transducer 10 about 25 mm wide and a length covering of the order 150° of the front perimeter of the device as illustrated in FIG. 2. As seen in FIG. 2, the strip-shaped transducer 10 is mounted above a number of microphone units 12, which together with the transducer 10 form an ultrasonic sonar system for the orientation of the device. The transducer is countersinked in a forward directed, movable bumper unit 16. The bumper 16 controls a left and a right bumper touch sensor, either one being actuated if the bumper makes contact with an obstacle. From FIGS. 2 and 3 it will be seen that the device has two diametrically positioned wheels 17, 18 and a third wheel 19 at the back. The wheels 17, 18 are each independently driven by a separate motor equipped with a gearbox. The wheels 17, 18 are connected directly on the outgoing axis from the gearbox. The driven wheels 17 and 18 enables the device to also rotate around its own symmetry center. On each axis from the gearboxes connected to the wheels 17 and 18 respectively a slotted disc and a HP slotted disc encoder is mounted. The quadrature signals from the slotted disc encoders are connected to a microprocessor controlling the device. The third wheel 19 supports the back of the device. The direction of the wheel 19 will be dependent on the driving of the two wheels 17 and 18 as it may rotate around a vertical shaft. The device is balanced with a slightly larger weight on the rear half of the device, carrying for instance the batteries, such that it will always move with all three wheels in contact with the floor. Due to this balancing the device may easily climb the edges of floor carpets and the like. The balance is also sensed by a tilt switch in the device.

In another embodiment the stripe-shaped transducer is divided into two stripe-shaped transducers, on upper portion and one lower portion. The number of microphone units then will be positioned between the two portions of the sonar transmitter.

Figure 3:
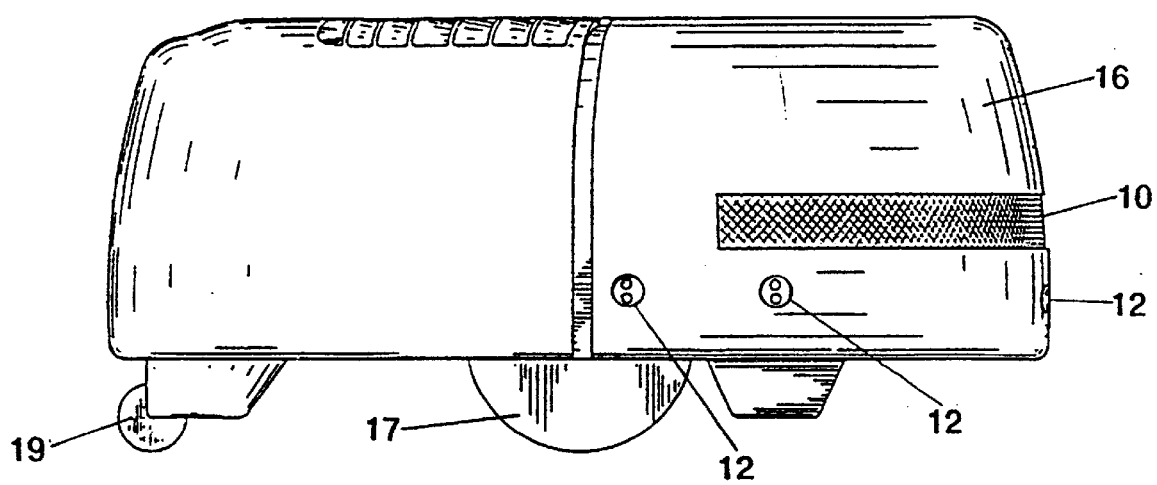
FIG. 3 demonstrates a side view of the device of FIG. 1.
Figure 5:
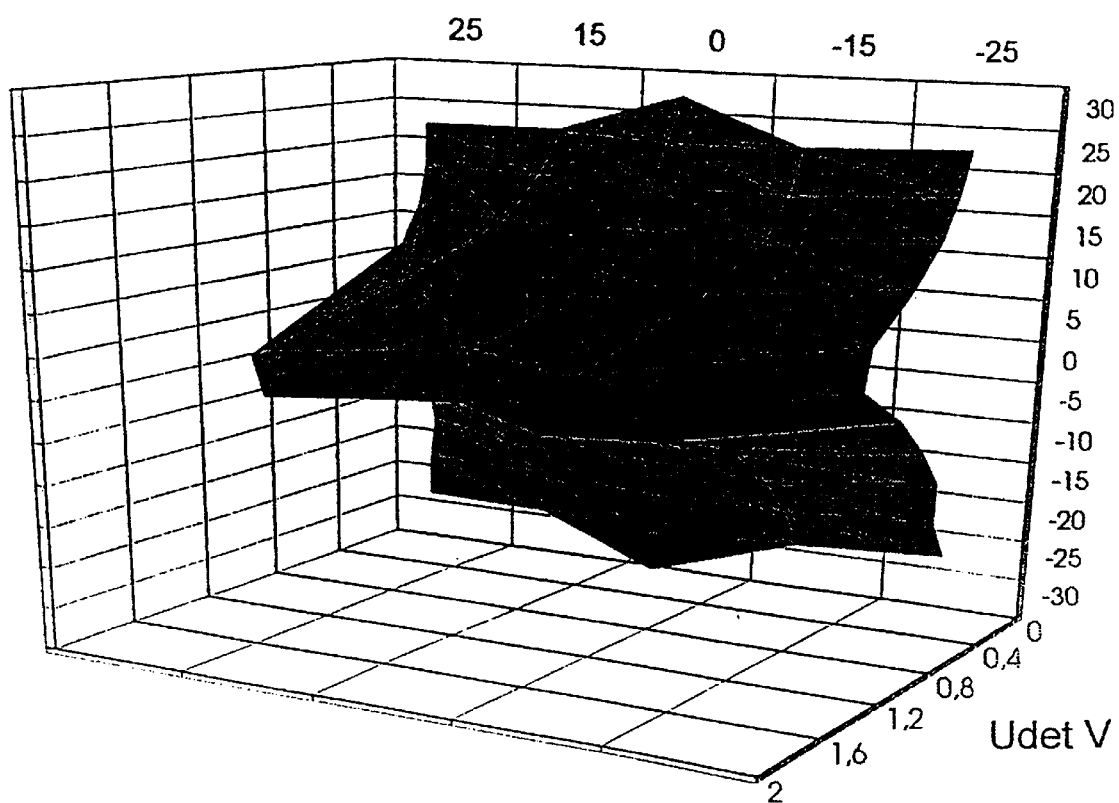
FIG. 5 shows a graph illustrating directivity of a sonar transducer utilized in the present system.
Figure 4:
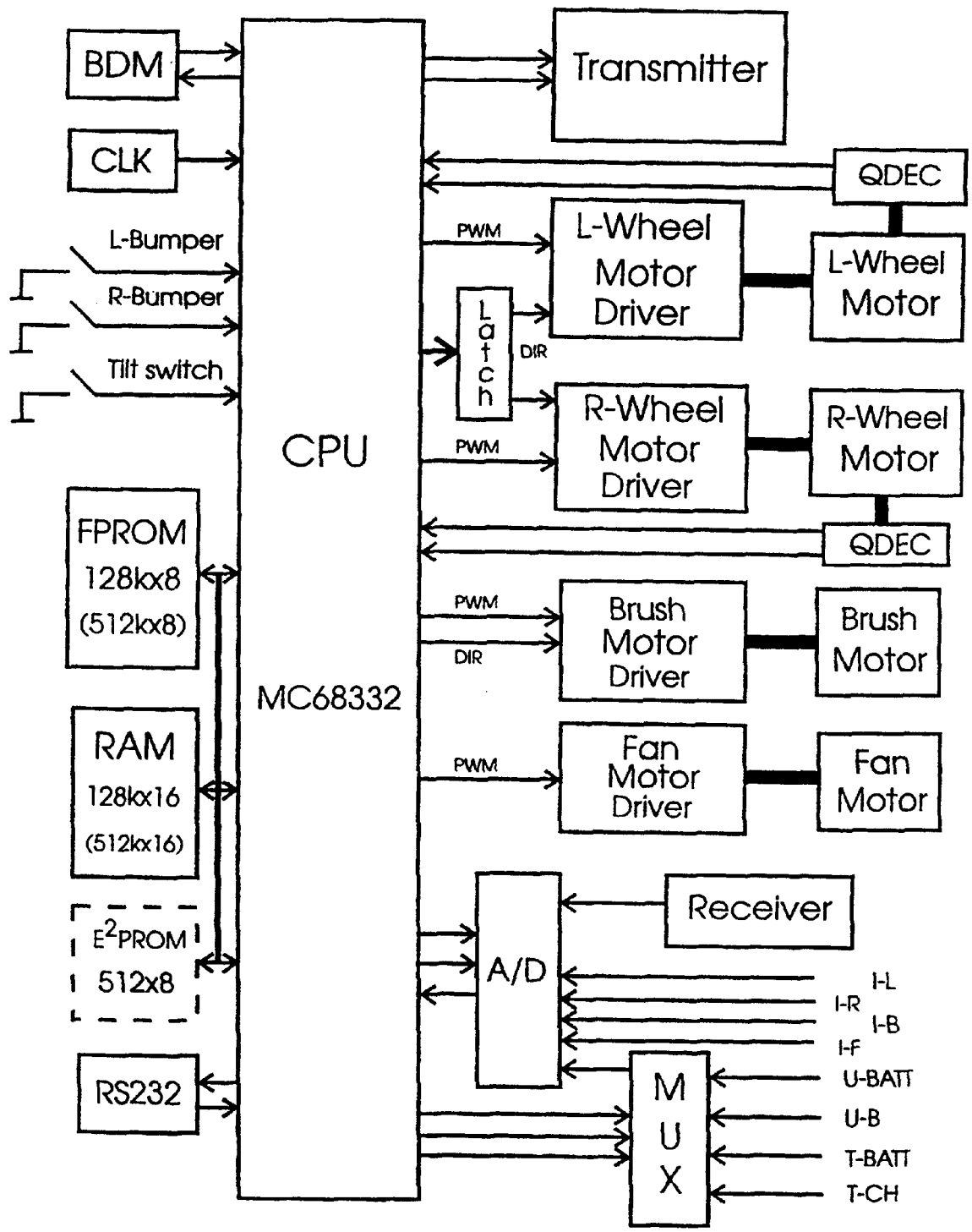
FIG. 4 demonstrates a hardware block diagram of the device according to FIG. 1 illustrating an embodiment incorporating the present invention.

In FIG. 4 is illustrated a hardware block diagram of the device according to FIGS. 1, 2 and 3. The hardware is essentially built around a data processor type MC68332 from Motorola Inc. The signals from the slotted disc encoders are connected to Timer Processor Unit (TPU) inputs of the MC68332. The processor (running in QDEC mode) giving position information with an accuracy of 2000 slots per revolution controls, via respective drivers, left and right wheel motors. The wheel motors are separately controlled by pulse-width modulated signals of 5 kHz generated by to more channels from the Timer Processor Unit in the main processor. The processor also controls two additional motors, one for the rotating brush and another for the fan generating the necessary vacuum for the general function of the vacuum-cleaner. Air from the fan motor is additionally in a known manner utilized for cooling purposes and the air is exhausted at a gilled outlet at the top of the device.

The processor is controlled by software stored in a number of different types of digital memories for example of type FPROM, RAM or EEPROM, which are all well known to a person familiar to computer techniques. Communication with the control system may be obtained through a standard RS-232 interface. Additionally the processor has its own clocking system also known from prior art. The system as illustrated in FIG. 4 further comprises three touch switches, L-Bumper, R-Bumper and tilt switch, and a transmitter and a receiver for a sonar localization sensing system, which portions constitutes the part of the system involving the present invention and which will be described more in detail below.

The Sonar Localization System

In the illustrative embodiment the obstacle detection subsystem consists of an ultrasonic sonar and a bumper. The sonar is used for detection of obstacles in the path of the moving device, pinpointing the exact location of the nearest obstacle and sensing the presence of a floor. There is a semicircular capacitance film-transducer mounted on the perimeter of the device, together with three microphones, for detection of objects having an essentially vertical profile. For sensing floors and staircases there are additionally two piezoelectric beepers mounted in front of the two driven wheels, facing downwards, together with two additional microphones. The bumper has two touch switches, one for each side, and which are used for emergency stopping when an obstacle, still undetected by the sonar, has been hit.

The physical stripe-shape of the transducer gives it a beam pattern with a wide horizontal distribution, while the vertical distribution is rather narrow. A typical beam pattern for a 45 degree transducer is shown in FIG. 4 and demonstrates a pronounced narrowed pattern between −10° to +10° in the forward elevation angle. The use of a distributed sound source will minimize eventual dead zones and at the same time facilitate an easier detection in a near zone where an obstacle exists. Utilizing an omni-directional source implies that a part of the localization must be performed by triangulation which in turn implies that all microphone channels must have the same response and that the object to be located must preferably reflect equally in all directions.

Figure 9:
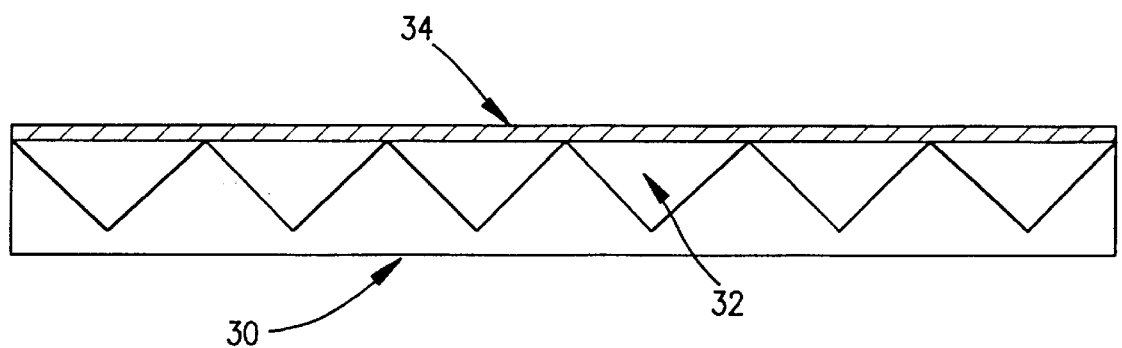
FIG. 9 illustrates build-up of a stripe-shaped transducer.

An available transducer type is a single sided electrostatic transducer of Sell type, which works by electrostatic attraction. FIG. 9 shows a build up of a Sell transducer which comprises an electrically conducting corrugated back-plane 30 which is generally acoustically transparent, for instance in form of a wire mesh. The corrugation sets the air gap 32 and thereby both the transmitter sensitivity and its maximum emitted intensity.

The other electrode 34 consists of a movable film which is metallized on the side not in contact with the corrugated backplane 30. In the preferred embodiment the stripe-shaped transducer 10 is formed by first attaching a corrugated copper film to the perimeter of the inner basic curved structure and on top of the corrugated copper film a plane insulated conductive film forming the moving part of the stripe-shaped electrostatic transducer. Thus the insulation of the conductive film is facing the corrugated copper film. The corrugated copper film has an adequate waffle pattern. Note that this preferred device is intended to transmit in the opposite direction compared to the general Sell type demonstrated in FIG. 9. In front of the transducer is additionally placed a protective wire mesh at a rectangular opening along the perimeter of the bumper 16, covering a forward angle of the order 150°. Thus the corrugated film constitutes one electrode and the insulated conductive film the other electrode of the transducer. The transmitter will be non-linear which implies that it rectifies an applied AC signal if a biasing voltage is not applied together with the AC signal. Documentation on Sell transducers is for instance found in IEE Transactions on Ultrasonics, Ferroelectrics and Frequency Control, #1 Vol 42, January 1995, which is expressly incorporated here by reference. The utilized transducer will be further described below.

Figure 6:
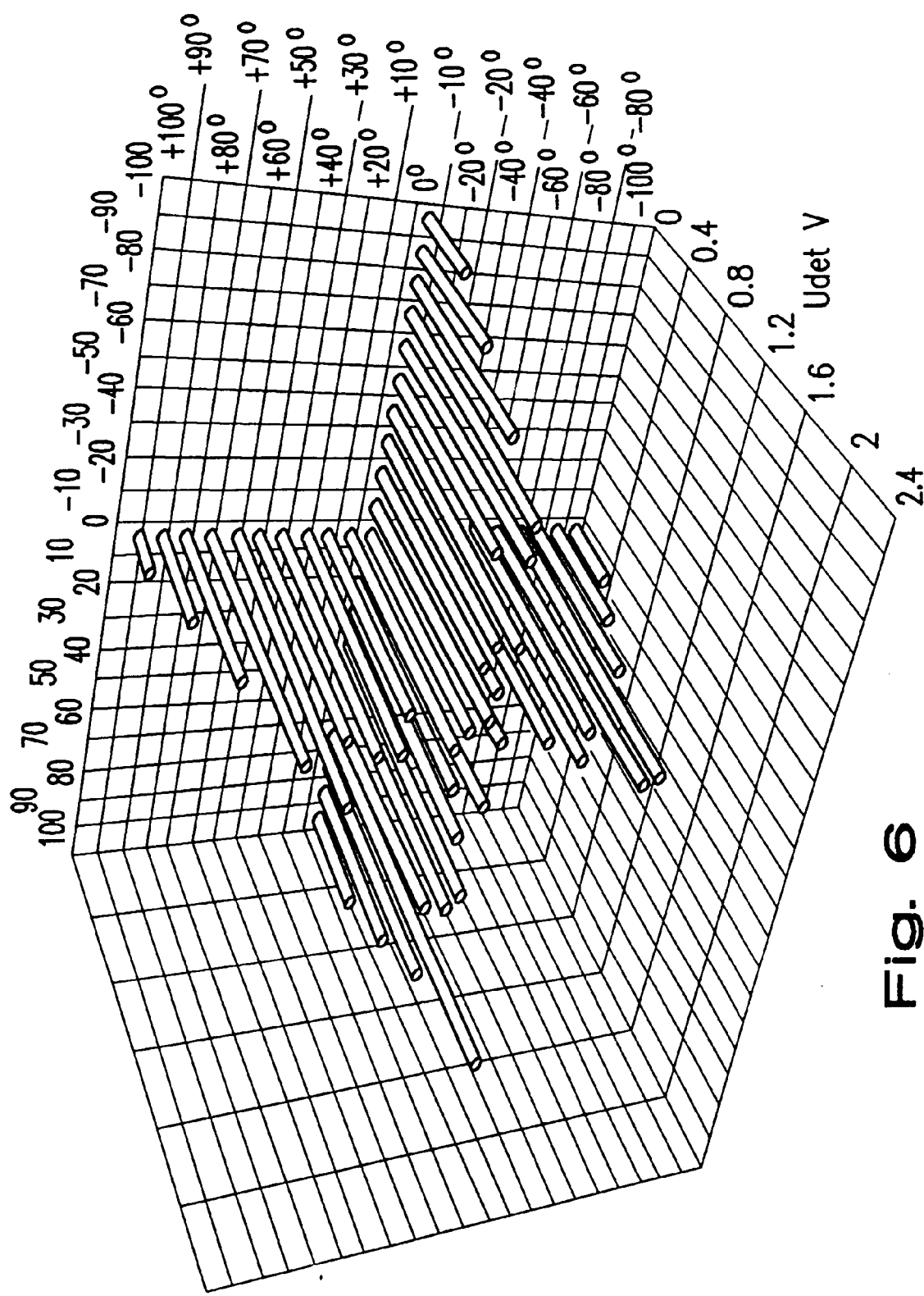
FIG. 6 shows a graph illustrating directivity of a naked microphone for a sonar system.

The other important parts of the sonar system are the microphones. The microphones are mounted behind an arrangement of two vertically aligned hollow pipes for the sound in order to give them a desired directivity. In FIG. 6 is demonstrated the horizontal and vertical directivity of a microphone suitable for a sonar system. The diagram plots the generated relative voltage in a vertical plane −100° to +100° and similarly in a horizontal plane −100° to +100°. The directivity of a naked microphone is almost omni-directional, as indicated by the diagram of FIG. 6.

Figure 7:
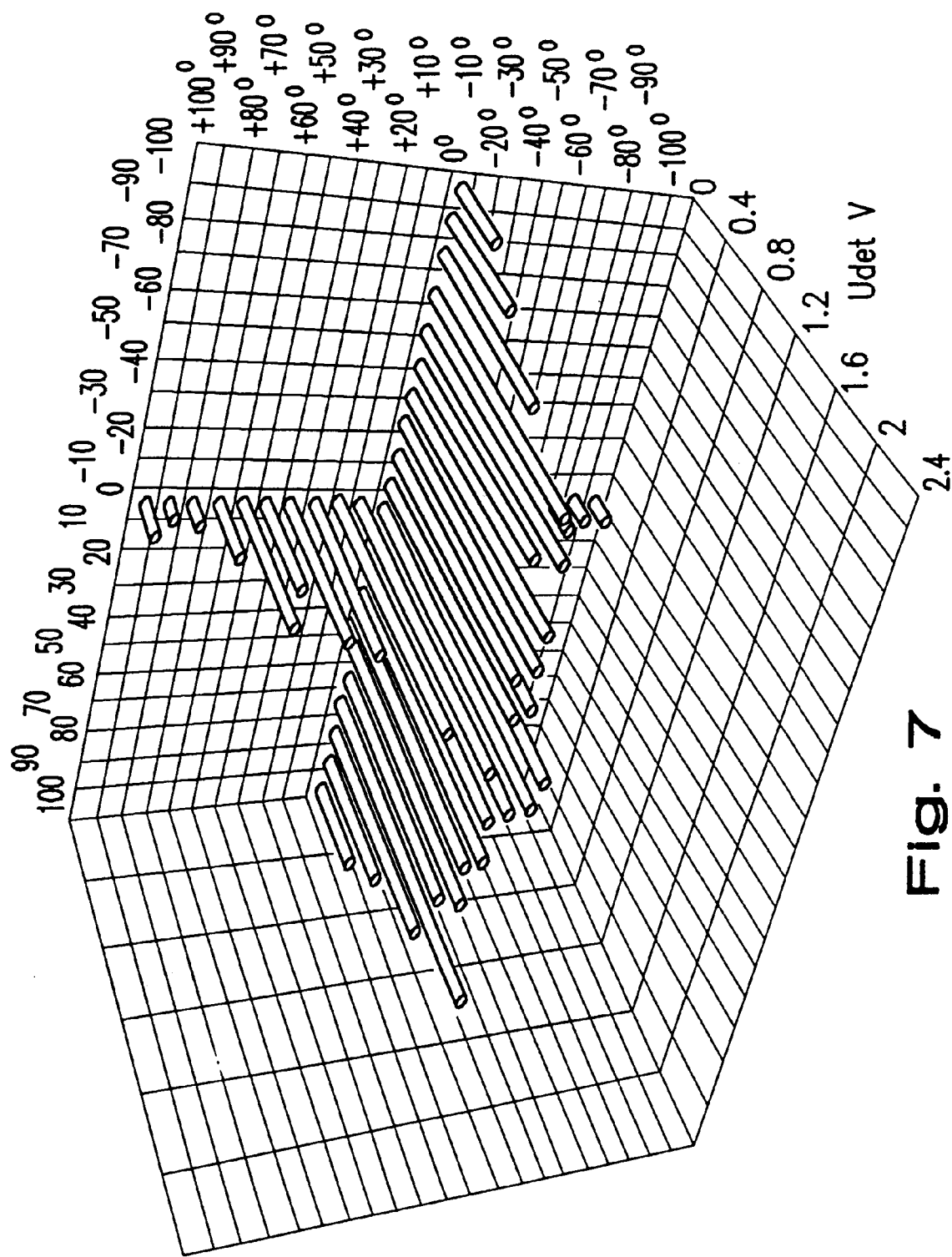
FIG. 7 shows a graph illustrating the directivity of a microphone provided with hollow pipes utilized in the present sonar system.

Introducing the vertically aligned horizontal hollow pipes or tubes together with the already obtained narrow vertical distribution of the transmitter, echoes from the floor as well as from sharp edged carpets etc., will be heavily suppressed. FIG. 7 demonstrates the directivity for a microphone provided with two vertically aligned horizontal hollow tubes, or pipes, in a diagram similar to the diagram shown in FIG. 6.

With the sound pipes the directivity in the vertical plane is greatly improved as can be seen in the diagram. This gives a much simplified detection of objects in the near zone, where echoes from the floor and the device itself are strongest.

Figure 8:
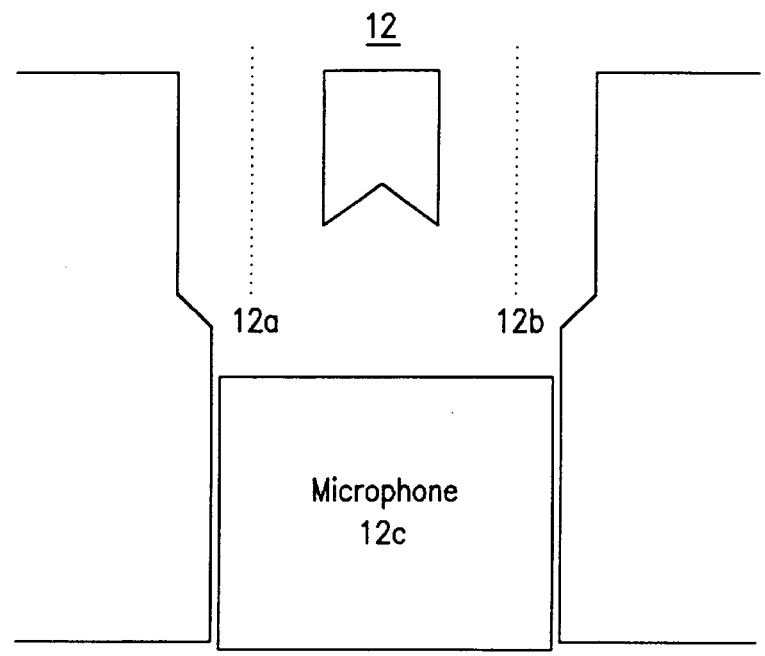
FIG. 8 is a vertical cut of a microphone provided with hollow pipes for the received sound.

FIG. 8 demonstrates a cross section of a microphone unit 12 with two hollow sound pipes. In the present embodiment the two pipes, 12a and 12b have a diameter of 2.5 mm and a center distance of 4.25 mm. The total diameter of the microphone unit is of the order 8 mm and the depth about 12 mm which means that the microphone element 12c is countersinked about 6 mm into the microphone unit.

Detailed Description

The Motorola central processor unit MC68332 directly generates the necessary pulse train to drive the transmitter. Since transducer element is rectifying, the frequency of the generated sound is twice the frequency of the input signal. FIG. 9 illustrates a simplified block diagram of the sonar transmitter utilized in an preferred embodiment of the present system. In the presently preferred embodiment of the present invention the signal consists of three periods of 20 kHz with a duty cycle of 40% generated from channel 0 of the Timer Processor Unit (TPU), which is running in a Position-Synchronized Pulse Generator (PSP) mode. The time reference is determined by channel 1 running in Period Measurement With Additional Transition Detection (PMA) mode. (Further information on PSP and PMA is found in Application Notes TPUPN14/D and TPUPN15A/D). PMA requires a clock connected to E2CLK input and an input signal with evenly spaced pulses, plus an additional pulse at a specified point. This signal is generated by the PCS0 signal from the Queued Serial Module (QSM), also an integrated device in the MC68332 CPU. Frequency and duty cycle of the transmitted burst can be varied by changing the programming of the PSP function. Burst length (number of pulses) is controlled by changing the programming of the PCS0 signal from QSM. All this is done in a software module (not shown) which will be obvious to a person skilled in the art.

Figure 10:
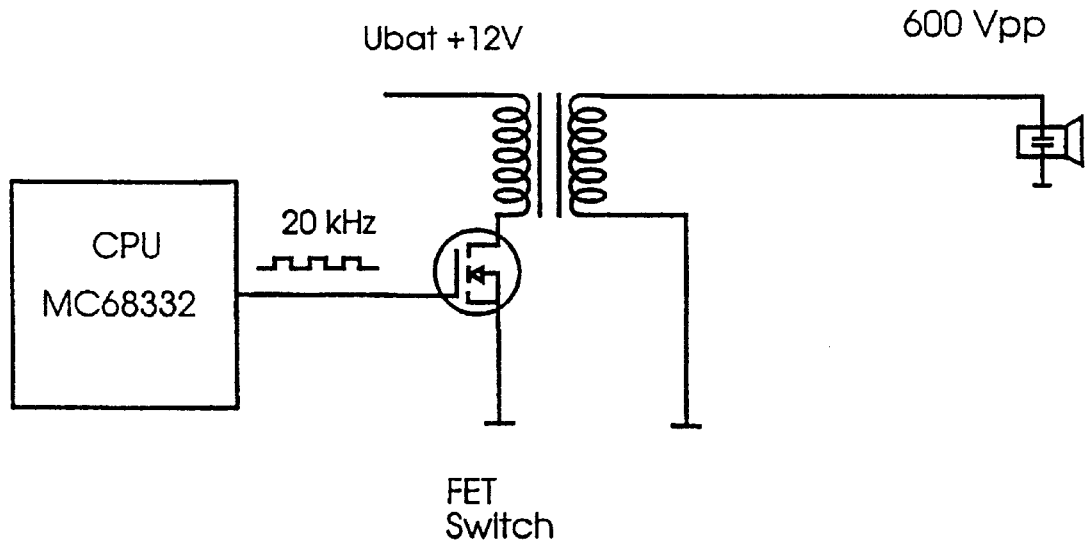
FIG. 10 shows a simplified sonar transmitter block diagram utilized in an embodiment of the present system.

In FIG. 10 is illustrated that the signal from the MC68332 CPU is output to a field effect switch, FET, having its source electrode connected to ground and via a transformer is driving the stripe-shaped ultrasound transducer. A primary 12 volts supply to the drain electrode of the field effect transistor, which keyed on its gate by the CPU MC68332, generates pulses of about 600 Vpp in the secondary winding of the transformer. The capacitance of the transducer and the inductance of the secondary winding form a parallel resonance circuit tuned to the operation frequency of the ultrasonic transmitter.

Figure 11:
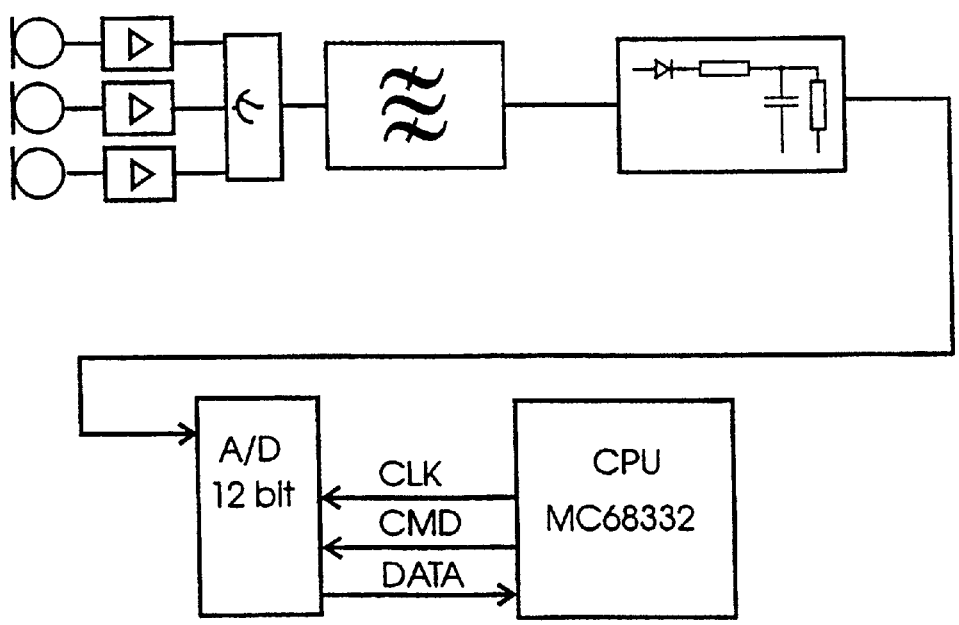
FIG. 11 shows a sonar receiver block diagram utilized in an embodiment of the present system.

The receiver demonstrated in a simplified receiver block diagram in FIG. 11 uses an analog multiplexer to select one of the three main microphones 12 or an extra side microphone (not shown in the diagram) for a wall tracking, (or one of the two floor sensing microphones in front of the driven wheels 17, 18), as input to a bandpass-filter followed by an envelope detector. The microphones in the present embodiment are connected to individual amplifiers of about 40 dB gain. The bandpass-filter of the present embodiment is a 6 pole filter having a bandwidth of 15 kHz centered at 40 kHz and a filter gain of about 40 dB. The envelope detector like the preamplifiers and the bandpass-filter constitute a standard configuration well known to a person skilled in the art. The signal from the envelope detector is then fed to a 12 bit serial A/D-converter, under control of the QSM. Samples are stored at a rate of 40 kilosamples per second, starting one millisecond before and ending twentyfour milliseconds after the transmitted ultrasonic burst. Clocked by A/D transfers the QSM outputs the peripheral chip selects PCS0 and PCS1. PCS1 is issued at positions number eight and sixteen triggers an interrupt to the main CPU, indicating that there are eight samples ready in the QSM receive registers. The QSM can hold sixteen received samples, corresponding to sixteen command words that control the transfer. After sixteen command words the QSM wraps back and restarts the command sequence. In this way the QSM synchronizes A/D conversions autonomously, interrupting the CPU (through TPU channel 2, in Discrete Input Output (DIO) mode), only when necessary. When the CPU has received all expected samples, the QSM is disabled. PCS0 is issued at samples number one and nine, giving the base clock for the PMA function. An additional pulse is the programmed at a desired position somewhere in between, (in this case at sample number six), to identify the "additional" transition. This triggers the PSP function in channel 0 to start the burst that generates the sound. The burst is only generated once per reception cycle and perfectly synchronized to the receiver A/D sampling clock, making it easy to correlate a sample number to an exact time relative to the transmitted burst.

Analyzing Received Data

Figure 12:
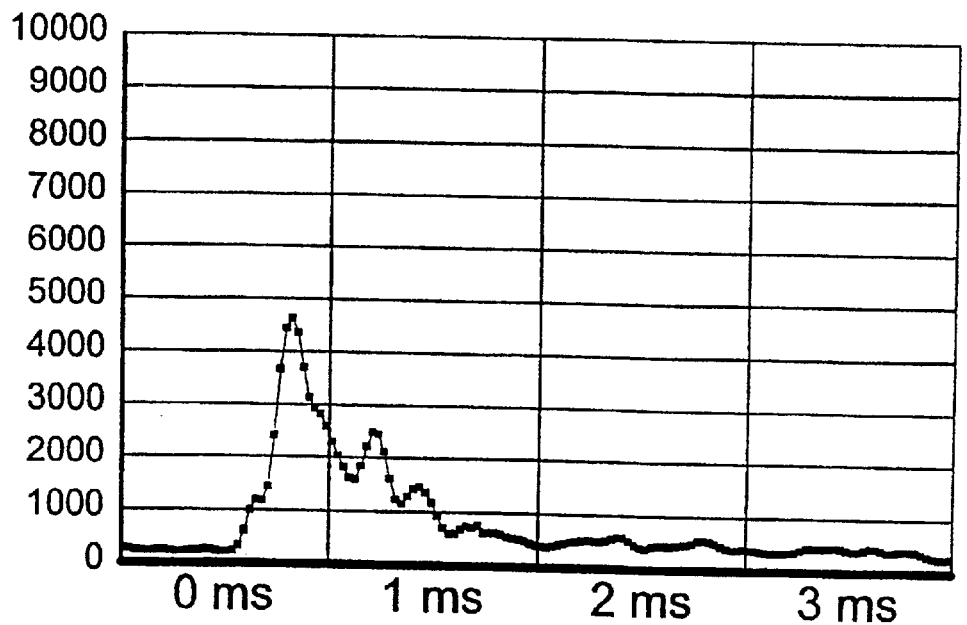
FIG. 12 shows an example of received signal when no obstacle is present.
Figure 13:
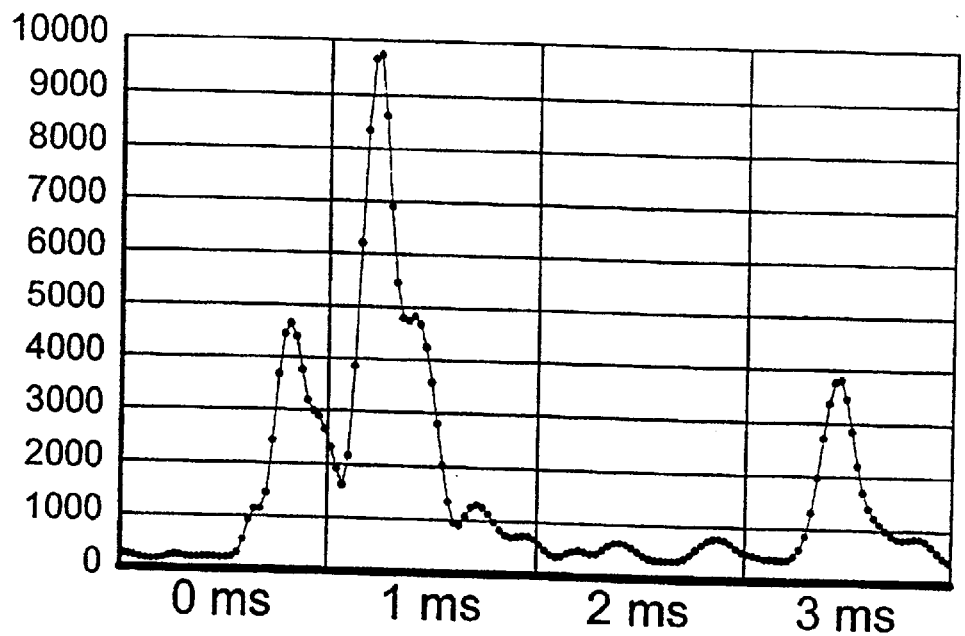
FIG. 13 shows an example of received signal when obstacles are present at distances of 5 cm and 45 cm.

The received raw data is divided in three parts used for different purposes. First the background noise level is calculated by using the data sampled before the burst is transmitted. Then the near zone is analyzed. The near zone in the present embodiment is the range from the perimeter of the device and up to about thirteen centimeters away, corresponding to about 750 microseconds. In this time window the received signal is heavily contaminated by echoes from the floor and from the device itself. In order to distinguish any obstacle in this region, a typical decay pattern for each microphone is maintained and subtracted from the received signal. In FIG. 12 is illustrated the relative echo amplitude for a microphone of the present embodiment with no obstacle present. In FIG. 13 is illustrated the relative echo amplitude of the same microphone with obstacles at distances 5 and 45 cm. After substraction of the typical decay pattern the remaining peaks are compared to a fixed threshold and, if above this preset threshold, considered to be representing an obstacle. Last, the zone beyond the near zone is scanned for peaks above fixed threshold and offset by the calculated background noise level.

The exact location of an obstacle is not known by only using the information from each microphone since the detected object could be located anywhere on en ellipsis. To pinpoint the exact location of the nearest obstacle trigonometry is used in a standard geometrical way apparent to a person skilled in the art. Only the distance and angle to the nearest obstacle is calculated due to the complex mathematics that must be performed in real time. Also this is only done when travelling at low speed or stopped.

When traveling at high speed, the information from the different microphones is uses as is, to get an approximation of the distance to obstacles, and then switch to low device speed when obstacles are close enough.

Navigation

Normally the device moves in a straight line until an obstacle is encountered. If no obstacle is detected within 40 cm from the front, or 10 cm from the sides, high speed is used. High speed for the present embodiment corresponds to about 40 cm/s. If any obstacle is seen within this section, low speed is used. Low speed is then set to about 14 cm/s. Detection of an obstacle within a distance of a few centimeters causes the device to stop. After stopping, the closest obstacle is checked and the angle to the object is used as argument for calculating a new direction for travel. If the obstacle is found far out on either side, a small base angle is used. On the other hand, if the hit is straight ahead, a base angle of 60 degrees is used. To the base angle, a random angle of up to 60 degrees is added. In this way the autonomous device can find its way through a narrow passage with small turns and still bounce efficiently between bare walls. The distance between stops and the number of turns is monitored so that the "free run mode" switches into "stuck, breakout mode" if the travelled distance does not exceed a set minimum after a number of turns. Actually hitting anything "unseen" by the sonar and detected only by the bumper touch sensors causes the device to first backoff a few centimeters, and then continue as if the object is sensed on the corresponding side.

When the device has detected that it does not travel far enough between stops, it changes strategy into constantly turning and sensing the environment until a free passage is found or a full circle is covered. If after traveling a short distance another obstacle is detected the same procedure is repeated, continuing turning in the same direction. When a minimum distance is traveled without hitting a new obstacle, "free run mode" is reentered. On the other hand, if the device continues to find obstacles, it is turned off after a number of turns.

Normally when in the "stuck, breakout mode" the device switches off all other activities like for instance the rotating-brush and the fan producing the vacuum, unless the airstream from this fan is needed for the cooling of the device circuitry as controlled by temperature sensors.

When performing a cleaning task the device starts by tracking the walls defining the room. In the preferred embodiment there are four sonar microphone units in the bumper below the ultrasonic transmitter. Three microphone units are used for the forward navigation while a fourth microphone unit placed at the right side of the bumper takes care of the wall tracking. After the general investigation of the room by doing a wall tracking round the room the device starts the cleaning operation in a random manner and will go on until it estimates that it has covered all the accessible surface.

For a random number generation a standard pseudo-random number generator of the congruental type is used. As seed an 11 bit random number is used in order to use different sequences each separate run. This random number is generated by using the least significant bit of the A/D converted value from each of the 11 analog inputs.

It will be understood by those skilled in the art that various modifications and changes may be made to the present invention without departure from the spirit and scope thereof defined by the appended claims.

We claim:

1. A proximity sensing system for an autonomous device being provided with motor driven wheels for carrying out a specific cleaning function, said device comprising members for the orientation and guiding of the device by means of a microprocessor system forming a proximity sensing system which comprises at least one transmitting member and one receiving member and a mechanical sensing member in form of a forward directed bumper, characterized in that said transmitting member is a stripe-shaped ultrasound transducer extending along the front perimeter of the device and transmitting ultrasonic waves with a narrow vertical distribution within a wide sector in front of the device.

2. The system according to claim 1, characterized in that said transmitting member is a semicircular capacitance film-transducer mounted on the perimeter of the device together with said receiving member having at least three ultrasonic microphone units.

3. The system according to claim 2, characterized in that said transmitting member is divided into two portions presenting an upper stripe-shaped ultrasound transducer and a lower stripe-shaped ultrasound transducer having between them the receiving member.

4. The system according to claim 2, characterized in that said transmitting member is countersinked in the front portion of the device to further limit the vertical distribution of transmitted and received signals.

5. The system according to claim 2, characterized in that said transmitting member during each repeated transmission transmits a sequence of closely spaced pulses, the echoes of which will be integrated into one sampled reflection at a specific reflection distance by said receiving system.

6. The system according to claim 2, characterized in that said mechanical sensing member is actuating at least one touch sensor if the device makes contact to an obstacle in the course of the moving device.

7. The system according to claim 1, characterized in that said receiving member comprises a number of microphone units provided with hollow pipes for the sound to further improve the directivity pattern for each microphone unit.

8. The system according to claim 7, characterized in that said hollow pipes of the receiving microphone units are aligned vertically in respect to each other to produce an improved directivity in the vertical plane.

9. The system according to claim 7, characterized in that a further microphone unit is pointed to one side of the device to be used in a wall tracking operation.

10. The system according to claim 1, characterized in that said mechanical sensing member is actuating at least one touch sensor if the device makes contact to an obstacle in the course of the moving device.

11. A device for navigation of an autonomous device being provided with motor driven wheels for carrying out some specific cleaning function, said device comprising members for the proximity orientation and guiding of the device by means of a microprocessor system and a proximity sensing system which comprises at least one transmitting member and one receiving member and a mechanical sensing member in form of a forward directed bumper, characterized in that said transmitting member is a stripe-shaped ultrasound transducer extending along the front of the device and transmitting ultrasonic waves with a narrow vertical distribution within a wide sector in front of the device.

12. The device according to claim 11, characterized in that said transmitting member is a semicircular capacitance film-transducer mounted on the perimeter of the device together with said receiving member having at least three microphone units.

13. The device according to claim 12, characterized in that said transmitting member is divided into two portions presenting an upper stripe-shaped ultrasound transducer and a lower stripe-shaped ultrasound transducer having between them the receiving member.

14. The device according to claim 12, characterized in that said transmitting member is countersinked in the front portion of the device to further limit the vertical distribution of transmitted and received signals.

15. The device according to claim 12, characterized in that said transmitting member during each repeated transmission transmits a sequence of closely spaced pulses, the echoes of which will be integrated into one sampled reflection at a specific reflection distance by said receiving system.

16. The device according to claim 12, characterized in that said mechanical sensing member is actuating at least one touch sensor if the device makes contact to an obstacle in the course of the moving device.

17. The system according to claim 11, characterized in that said receiving member comprises a number of microphone units provided with hollow pipes for the sound to further improve the directivity pattern for each microphone unit.

18. The device according to claim 17, characterized in that said hollow pipes of the receiving microphone units are aligned vertically in respect to each other to produce an improved directivity in the vertical plane.

19. The device according to claim 17, characterized in that a further microphone unit is pointed to one side of the device to be used in a wall tracking operation.

20. The device according to claim 10, characterized in that said mechanical sensing member is actuating at least one touch sensor if the device makes contact to an obstacle in the course of the moving device.

* * * * *